Feb. 28, 1928.

A. MONARD 1,660,623

LIQUID METER

Filed Oct. 7, 1924    2 Sheets-Sheet 1

INVENTOR:
A. Monard
by Marks and Clerk

Feb. 28, 1928.

A. MONARD

LIQUID METER

Filed Oct. 7, 1924   2 Sheets-Sheet 2

1,660,623

INVENTOR:
A. Monard
by Marks and Clerk

Patented Feb. 28, 1928.

1,660,623

UNITED STATES PATENT OFFICE.

ALFRED MONARD, OF PARIS, FRANCE, ASSIGNOR TO SOCIÉTÉ L'ASTER, OF PARIS, FRANCE, A CORPORATION.

LIQUID METER.

Application filed October 7, 1924, Serial No. 742,247, and in France June 26, 1924.

The present invention relates to meters in which the amount of liquid to be supplied is determined in advance. In such meters, when the supply cock is opened, the driven element of the meter actuates a mechanism which determines the stopping of the supply after a certain amount of liquid has been withdrawn, this amount being preliminarily fixed by the operator by means of a pointer moving upon a dial.

Such apparatus are known per se, but the present invention relates to the device which determines the stopping of the supply at the proper point. My improved mechanism comprises a spring-mounted slide controlling the supply cock or valve, said slide ending in a roller which is movable transversely and is urged outwardly by a spring; said roller makes contact with a cam which is actuated by the main driving element of the meter and has formed therein a cut out part of suitable shape for the exit of the said roller. A suitable recess is also formed adjacent the said cut out part, for the insertion of the end of the said slide which has been uncovered by the displacement of the roller.

During the operation of the apparatus, when the said cut out part coincides with the roller, the latter will escape, and the said slide, under the action of its spring, will move to a slight degree and will allow the said supply cock to automatically close.

In the appended drawings which are given by way of example:

Figure 1:
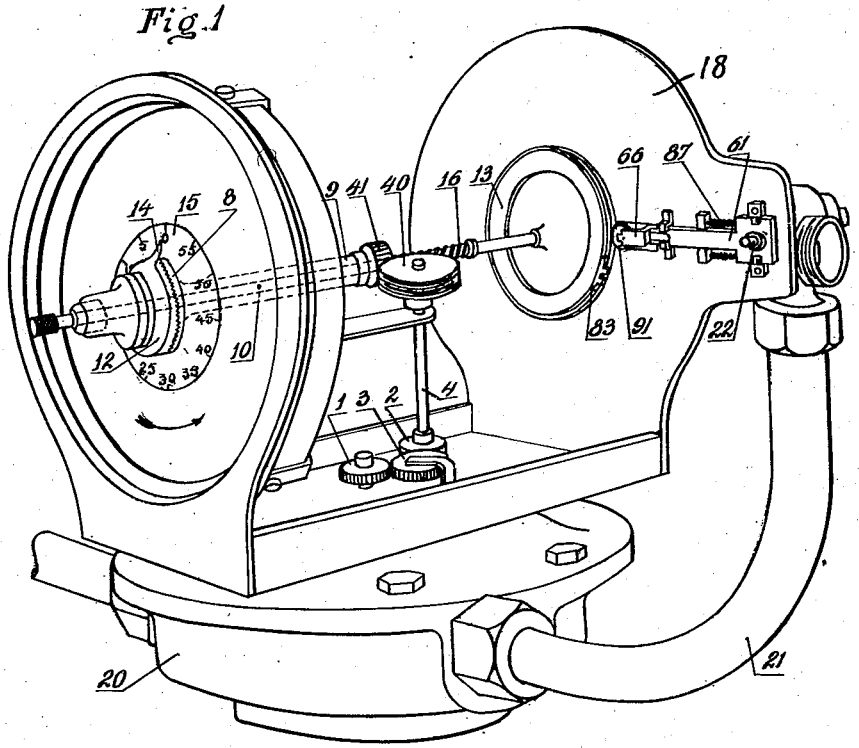
Fig. 1 is a general view of a meter comprising my said improvements.

The meter shown in Fig. 1 comprises a driving element contained in a casing 20 which is mounted on the conduit 21 for the flow of the liquid; said element drives the gear wheel 1 which engages the gear wheel 2 either directly or by means of the pinion 3. The wheel 2 is mounted on a shaft 4 carrying at the top the worm 40 coacting with the worm wheel 41 which is mounted on a sleeve 9, said sleeve also carrying the radially toothed disk 8.

The shaft 10 extending through the sleeve 9 carries a cam 13 and a radially toothed disk 12 which is maintained in engagement with disk 8 by the spring 16. On the disk 12 is mounted the pointer 14 showing the output of the meter, which moves upon the dial 15. On the rear cheek 18 of the said casing is mounted an automatic release valve 19 whose disk 28 (Figs. 3 and 4) is controlled by the spring 29 and carries an outwardly extending rod 22.

The arrangement and operation of a meter of this kind are well known and the object of my invention is solely the automatic release of the valve 28 when the proper amount of liquid has been supplied.

The cam 13 comprises two concentric peripheral parts, 80 and 82. The part 80 is provided with a cut out portion 81 and the part 82 is provided with a sector 83 having a recess 84.

The slidable member 61 can be moved horizontally, and it is maintained by the supports 85; said member is urged outwardly by the springs 87 which bear against the suitably disposed abutments 88.

One end of said slidable member is apertured at 89, and its other end terminates in a fork 66.

The tapered orifice 89 serves for the insertion of the valve stem 22 on which is a correspondingly tapered shoulder D.

The fork 66 which carries the stud 90 holds between its branches an axle 64 upon which is mounted the slidable roller 65 which is urged against the cam 13 by the spring 67 and which has the tapered part 91 upon the face adjacent the said cam.

Figure 4:
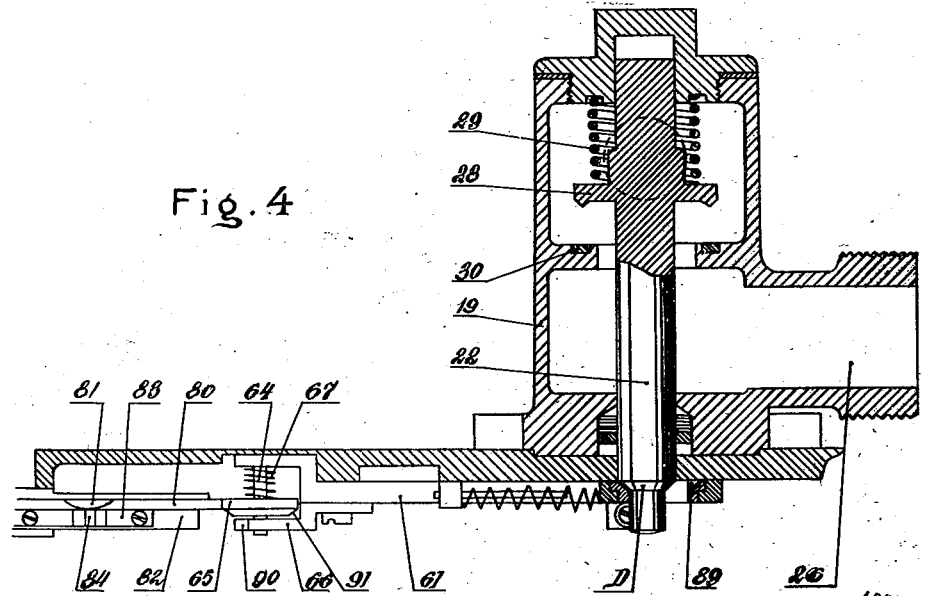
Fig. 4 is an analogous view, in which the position of the parts is such that the liquid is in course of delivery.

The operation is as follows:

To start the apparatus, all that is necessary is to press upon the rod 22, after the pointer 14 has been brought upon the number showing the amount of liquid to be furnished. The slide 61 is thus released, and under the action of the springs 87 it will hold the rod 22 in place (Fig. 4). At the same time, the roller 65, urged by the spring 67, will slide on the axle 64, thus bearing against the periphery of the cam portion 80.

The motion of the main driving element is imparted to the shafts 9 and 10 by the sets of gearing 1—2, 40—41 provided for the purpose.

Figure 2:
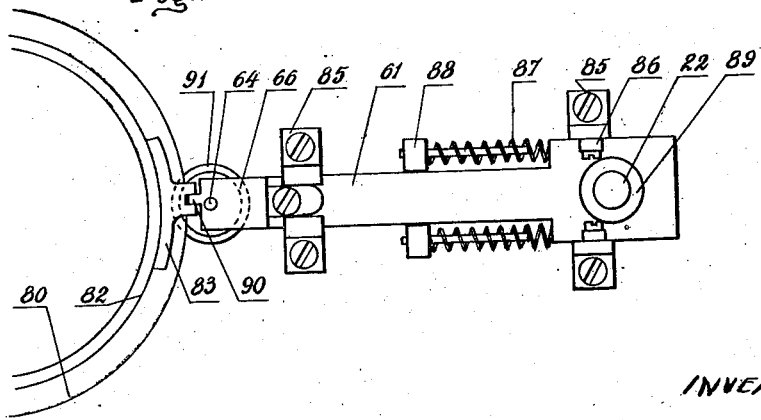
Fig. 2 is an elevational view of the details of the slide controlling the cock.
Figure 3:
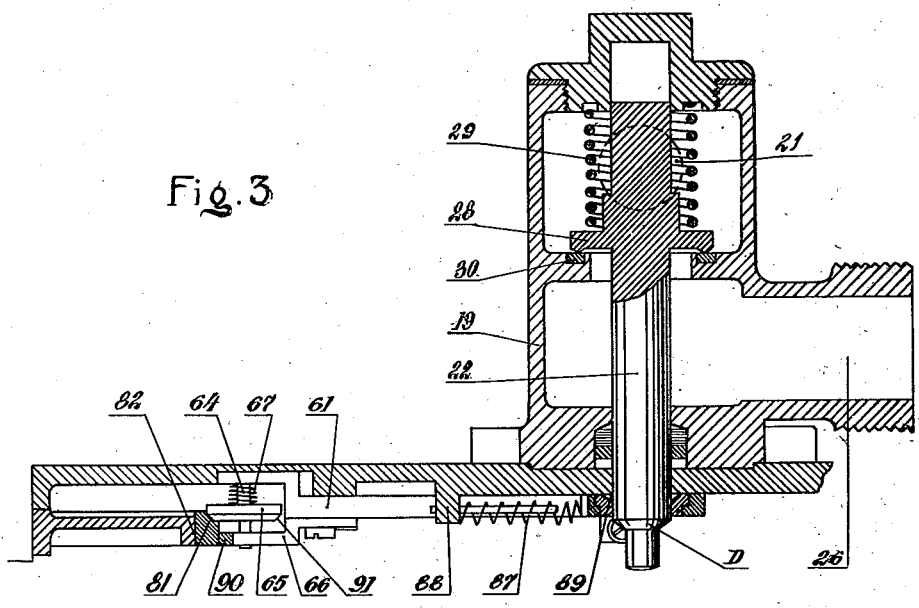
Fig. 3 is a sectional view of the said slide, with the apparatus in the inoperative position, i. e. when the stopping device has been released and the flow of liquid arrested.

When the inidating pointer comes upon the zero figure, which also corresponds to the greatest amount to be supplied, the cam attains the position shown in Figs. 2 and 3, i. e. the said roller now coincides with the cut out part 81, and the stud 90 of the fork 66 coincides with the recess 84. The said slide is now driven back by the rod 22, and the roller slides through the cut out part 81 to the rear of the cam, whilst the stud 90 holds the said cam in place.

It will be noted that a very slight rotation of the cam will be sufficient to set the apparatus, on the contrary to what prevails in the known devices, and this offers a great advantage, since this will provide for the supply of a very small fraction of the amount corresponding to one revolution of the said cam.

Obviously, the said construction is susceptible of various modifications in detail, without departing from the spirit of the invention, for instance the springs 87, instead of pushing the said slide, may suitably draw it forward.

I claim:

In a liquid meter, having a valve controlled liquid inlet said valve being provided with a valve stem, means for automatically closing said valve after a predetermined quantity of liquid has passed through said meter, said means comprising a cam actuated by liquid passing through said meter, said cam having a recessed portion in one face thereof, a slidably mounted bar positioned between said cam and the aforementioned valve stem, one end of said bar being forked, a spring pressed roller disposed in said forked end, said roller engaging with said cam and adapted to be displaced into the recess thereof immediately prior to the closing of said valve, a stud mounted on one of the forks of said forked end, a sector mounted on said cam adjacent the recess therein, said sector having a cut out portion adapted to engage with said stud, and means on said bar remote from said forked end to engage with said valve stem whereby said valve is held in an open position when said roller rides on said cam and to release said valve stem to close said valve when said roller engages with the recessed portion of said cam and said stud engages in the cut out portion of said sector.

In witness whereof I affix my signature.

ALFRED MONARD.